Nov. 17, 1953

T. E. LEONTIS ET AL 2,659,137

COMPOSITE ALLOY

Filed Aug. 16, 1950

INVENTORS.
Thomas E. Leontis
BY Robert S. Busk

Griswold & Burdick
ATTORNEYS

Patented Nov. 17, 1953

2,659,137

UNITED STATES PATENT OFFICE 2,659,137

COMPOSITE ALLOY

Thomas E. Leontis and Robert S. Busk, Midland, Mich., assignors to The Dow Chemical Company, Midland, Mich., a corporation of Delaware Application August 16, 1950, Serial No. 179,778

6 Claims. (Cl. 29—192)

1

The invention relates to a magnesium-base alloy article. It more particularly concerns a tin-containing magnesium-base composite alloy having a high tensile strength and the lightness characteristic of magnesium.

The term "magnesium-base alloy" used herein means a magnesium alloy containing at least 80 per cent of magnesium by weight.

The invention is predicated upon the discovery that by die-expressing at elevated temperature a tin-containing magnesium-base alloy in particulated form in admixture with one of the magnesium-soluble metals aluminum and zinc in particulated form a high strength composite alloy extrusion is obtained. The composite alloy extrusion has the same compactness and integrity as the usual magnesium-base alloy extrusions made by extruding a solid mass, such as an ingot of a magnesium-base alloy, but the metallographic structure of the composite product is uniquely different. Metallographic examination reveals a new type of structure in a magnesium-base alloy article. The structure is essentially multimetallic. Each of the particulated metals of the mixture which is extruded is changed to the form of an elongate particle. All the particles are oriented in the direction of the extrusion. The elongated particles are all welded one to the other into a solid mass without voids, forming a high strength composite alloy which may be treated or worked as by rolling, forging, pressing, etc. like conventional magnesium alloys. The invention then consists of the composite magnesium-base alloy product and method of making the same herein fully described and particularly pointed out in the claims, the following description setting forth several modes of practicing the invention.

In carrying out the invention, various magnesium-base alloys containing tin may be used as one of the ingredients of the composite alloy, such as those containing from about 0.5 to 8 per cent of tin; a preferred proportion of tin is about 4 to 6 per cent, the balance being magnesium. The tin-containing magnesium-base alloy is reduced to particulate form in any suitable way, such as by grinding or atomizing. The atomized form is preferred and may be produced by forming a melt of the alloy and atomizing it by impinging a jet of a cool gas, e. g.

2 natural gas, against a thin falling stream of the molten alloy. The atomized alloy consists of a mixture of various sized fine spherical rapidly solidified particles, the particles having a very fine grain structure. It is desirable to screen out particles coarser than those passing about a 10 to 20 mesh sieve.

The magnesium-soluble metal ingredient of the mixture of particulate metals to be extruded according to the invention is finely divided in any convenient manner. Its particle side preferably is made finer than that of the tin-containing magnesium-base alloy with which it is to be mixed.

Before extrusion, the particulated metals are mixed together in any convenient manner to form a uniform mixture of the metal particles comprising the extrusion charge. The relative amounts of the particulated tin-containing magnesium-base alloy and particulated magnesium-soluble metal are adjusted so that there is at least 0.1% up to as much as 6% by weight of the particulated magnesium-soluble metal in the mixture. A preferred proportion of the particulated zinc in the mixture is about 3%.

The mixture of particulated metals is charged into the heated container of a ram extruder, having a suitable size container and die opening and subjected to extrusion pressure to cause the mixture of particulated metals to be heated and extruded through the die opening.

As to the extrusion conditions, the temperature of the particulated metal mixture in the container may be about the same as that conventionally employed for extruding solid ingots of the known tin-containing magnesium-base alloys, e. g. about 600° to 800° F. The ratio of the cross-sectional area of the extrusion container to that of the die opening has a material effect on the mechanical properties of the composite extrusion product obtained. A desirable ratio is at least about 30 to 1, although ratios as high as 150 to 1 or more may be used. The speed of extrusion may be varied over a wide range and depends to some extent upon the size and shape of the die opening, in any case the speed is to be held down to that at which the extrusion produced is free from hot shortness. A safe extrusion speed may be ascertained by visual examination of the product as it extrudes, the hot shortness being evident as cracks in the extruded product and sharply reduced strength. The composite extrusion product may be subjected to any of the fabrication operations in use with the conventional or non-composite magnesium-base alloys, such as rolling, forging, drawing and welding, chemical finishing, electroplating, etc., and its tensile the united surfaces of the particles which become extended and lengthened during extrusion. At these surfaces, during extrusion or heat treatment, some diffusion of metal takes place between the tin-containing particles and the magnesium-soluble metal particles.

The following examples set forth in the table below are illustrative of the invention:

*Table*

| Example No. | Composition of Extrusion Charge of Particulated Magnesium Alloy (A) mixed with Al or Zn (B) | | | Extrusion Temp., °F. | Mechanical Properties in 1,000 p. s. i. of Extrusions [1] | | | | | | | |
|---|---|---|---|---|---|---|---|---|---|---|---|---|
| | | | | | ASX | | Aged | | H. T. | | H. T. A. | |
| | Wt. Percent A | Analysis of A | Wt. Percent B | | TYS | TS | TYS | TS | TYS | TS | TYS | TS |
| 1 | 99.5 | 4.26% Sn, Balance Mg | 0.5% Al | 620 | 33 | 42 | 38 | 44 | 27 | 37 | 27 | 56 |
| 2 | 97.0 | ----do---- | 3.0% Al | 620 | 35 | 43 | 39 | 43 | 30 | 39 | 29 | 38 |
| 3 | 94.0 | ----do---- | 6.0% Al | 620 | 38 | 42 | 41 | 44 | 34 | 41 | 34 | 43 |
| 4 | 99.5 | ----do---- | 0.5% Zn | 670 | 38 | 45 | 42 | 37 | 35 | 44 | 28 | 38 |
| 5 | 97.0 | ----do---- | 3.0% Zn | 670 | 38 | 47 | 39 | 45 | 24 | 38 | 24 | 38 |
| 6 | 94.0 | ----do---- | 6.0% Zn | 620 | 35 | 43 | 38 | 45 | 24 | 31 | 32 | 42 |
| Blank | 100 | ----do---- | none | 620 | 32 | 41 | 35 | 42 | 25 | 31 | 25 | 34 |

[1] ASX=as extruded.
Aged=heat treated for 16 hours at 350° F.
H. T.=heat treated for 1 hour at 750° F.
H. T. A.=heat treated for 16 hours at 350° F. followed by heat treating for 1 hour at 750° F.
TYS=tensile yield strength defined as the stress at which the stress strain curve deviates 0.2% from the modulus line.
TS=tensile strength.

properties may be modified by heat treatment.

The invention may be further illustrated and explained in connection with the accompanying drawing in which.

Figure 1:
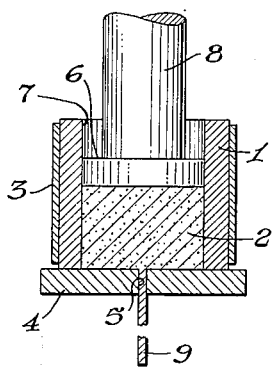
Fig. 1 shows a schematic sectional elevation of an extrusion apparatus suitable for use in practicing the invention.

As shown, the apparatus comprises, in its three forms, an extrusion container 1 adapted to confine a charge 2 of the mixture of metal particles to be compacted and extruded. The container is provided with a heating element 3. In Fig. 1, one end of the container 1 is closed by the die plate 4 in which is provided the die opening 5. In this form of the apparatus, the charge 2 is caused to be compacted in the container and extruded through the die opening 5 by application of pressure by means of the dummy block 6 forced into the bore 7 of the container by the ram 8 to form the extrusion 9.

Figure 2:
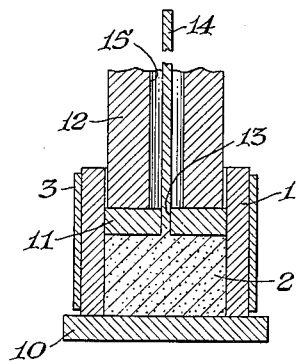
Fig. 2 is a similar view to Fig. 1 showing a modification of the apparatus.

In the form of the apparatus shown in Fig. 2, the container 1 is closed at one end by the plate 10. The other end of the container received the die block 11 carried by the hollow ram 12 which forces the die block into the container causing the charge 2 to be compacted and to extrude through die opening 13 to form the extrusion 14 which extends into bore 15 of the hollow ram 12.

Figure 3:
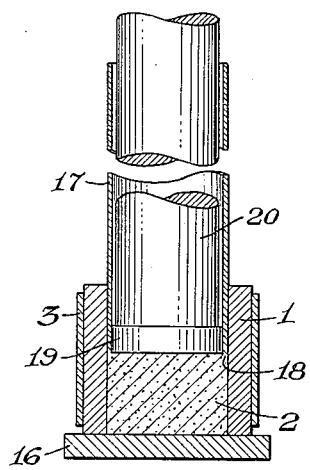
Fig. 3 is a similar view to Fig. 1 showing another modification of the apparatus.

In the modification of Fig. 3, the container is closed at one end with a plate 16. The charge 2 is extruded as a tubular extrusion 17 through the annulus 18 around the die block 19 while it is forced into the container by the ram 20.

The forms of the apparatus shown are conventional.

By putting a charge of the mixture of the metals involved under pressure while at heat, as with the apparatus shown the metal particles are compacted but not subjected to further mixing before extrusion. The metals originally in the charge as individual metal particles become welded together without voids and do not lose their original distinctive composition except at In making the composite alloys shown in the foregoing table, the tin-containing magnesium-base alloy was used in atomized form, the particles of which were of various sizes substantially all passing through a 20 mesh standard sieve but not a 200 mesh sieve. The particles of the particulated magnesium-soluble metal were of generally finer size than those of the magnesium-base alloy. The particulated metals were mixed together in the proportions indicated and the mixtures charged into the heated container of a ram extruder of the type illustrated in Fig. 1. For the blank, the tin-containing magnesium-base alloy in the same particulated form as used in the mixtures was extruded alone under comparable extrusion conditions. The rate of extrusion was about 1 to 2 feet per minute. The reduction in area was 34:1. The composite alloy extrusions produced were wire 0.086 inch in diameter having a multimetallic structure of elongated particles oriented in the same direction lengthwise of the extrusion and welded together without voids.

We claim:

1. The method of making a solid composite high strength metal body comprising a magnesium-base alloy which consists in forming a mixture of particulated metals from 0.1 to 6 per cent by weight of said mixture being a magnesium-soluble metal selected from the group consisting of aluminum and zinc, the balance of said mixture being a magnesium-base alloy containing from 0.5 to 8 per cent of tin, the balance of the said alloy being magnesium, and die expressing the mixture at a temperature between 600° and 800° F.

2. The method according to claim 1 in which the magnesium-base alloy contains 4 to 6 per cent of tin, the balance being magnesium.

3. The method according to claim 1 in which the magnesium-soluble metal is aluminum.

4. The method according to claim 1 in which the magnesium-soluble metal is zinc.

5. A composite metal body consisting of particulated metals from 0.1 to 6 per cent by weight of said body being a magnesium-soluble metal selected from the group consisting of aluminum and zinc, the balance of said body being a magnesium-base alloy containing 0.5 to 8 per cent of tin, the balance of the alloy being magnesium, the particles of each of the particulated metals being elongated, orientated in the same direction, and welded together into an integral solid.

6. A composite metal body according to claim 5 in which the magnesium-soluble metal consists of aluminum.

THOMAS E. LEONTIS.
ROBERT S. BUSK.

References Cited in the file of this patent

UNITED STATES PATENTS

| Number | Name | Date |
| --- | --- | --- |
| 1,913,133 | Stout | June 6, 1933 |
| 2,024,767 | Jeffries et al. | Dec. 17, 1935 |
| 2,205,865 | Schwarzkoff | June 25, 1940 |
| 2,332,277 | Stern | Oct. 29, 1943 |
| 2,355,954 | Cremer | Aug. 15, 1944 |

FOREIGN PATENTS

| Number | Country | Date |
| --- | --- | --- |
| 570,166 | Great Britain | June 26, 1945 |
| 570,906 | Great Britain | July 27, 1945 |
| 625,364 | Great Britain | June 27, 1949 |

OTHER REFERENCES

"Treatise on Powder Metallurgy" by Goetzel, vol. 2, pp. 500, 740, 741. Published in 1950.

"Symposium on Powder Metallurgy," Buffalo Spring Meeting, March 3, 1943, pp. 42, 43. Published by American Society for Testing Materials.